United States Patent [19]

Kawamura

[11] Patent Number: 4,626,910
[45] Date of Patent: Dec. 2, 1986

[54] CIRCUIT FOR PREVENTING FLICKER ATTRIBUTABLE TO FIELD SIGNAL-FRAME SIGNAL CONVERSION

[75] Inventor: Keiichi Kawamura, Kanagawa, Japan

[73] Assignee: Fuji Photo Film Co., Ltd., Kanagawa, Japan

[21] Appl. No.: 680,654

[22] Filed: Dec. 11, 1984

[30] Foreign Application Priority Data

Dec. 13, 1983 [JP] Japan ................ 58-233481
Dec. 13, 1983 [JP] Japan ................ 58-233482
Dec. 13, 1983 [JP] Japan ................ 58-233483

[51] Int. Cl.$^4$ .................. H04N 7/01; H04N 5/53
[52] U.S. Cl. .................. 358/140; 358/152; 358/160; 358/178; 360/11.1
[58] Field of Search ............ 358/140, 152, 160, 174, 358/176, 178; 360/11.1, 35.1

[56] References Cited

U.S. PATENT DOCUMENTS 4,175,272 11/1979 Numakura .................. 358/174
4,213,151 7/1980 Harford .................. 358/178
4,298,896 11/1981 Heitmann .................. 360/11.1
4,386,367 5/1983 Peterson .................. 358/152

FOREIGN PATENT DOCUMENTS 55-52506 4/1980 Japan .................. 358/174

Primary Examiner—Howard W. Britton

[57] ABSTRACT

In a field signal-frame signal conversion system including means for applying a delayed field signal delayed by ½ of one horizontal scanning period and a thru field signal, which is the same as the above field signal but not delayed, and switching means for alternately selecting the field signals at a time interval of one vertical scanning period to provide a frame signal, a circuit for preventing appearance of flicker attributable to the field signal-frame signal conversion, said circuit comprising a synchronizing signal separating circuit separating a synchronizing signal from the frame signal appearing at the output of said switching means, a sampling pulse generating circuit generating, in response to the application of the separated synchronizing signal, a sampling pulse signal synchronous with the change points from the sync tip level to the pedestal level and having a pulse width equal to or smaller than that of the serrating pulses, a sample and hold circuit operating in response to the sampling pulse signal for sampling the frame signal appearing at the output of said switching means, a clamping voltage generating circuit comparing the output signal of said sample and hold circuit with a reference value thereby generating a voltage signal proportional to the difference therebetween, and two clamping circuits connected to the thru and delayed field signal lines respectively and controlled by the output signal of said clamping voltage generating circuit for maintaining constant the pedestal level of the thru and delayed field signals.

9 Claims, 15 Drawing Figures

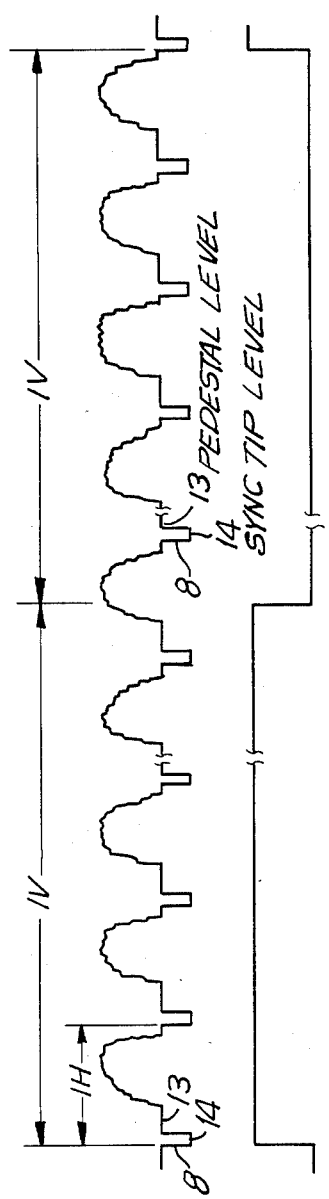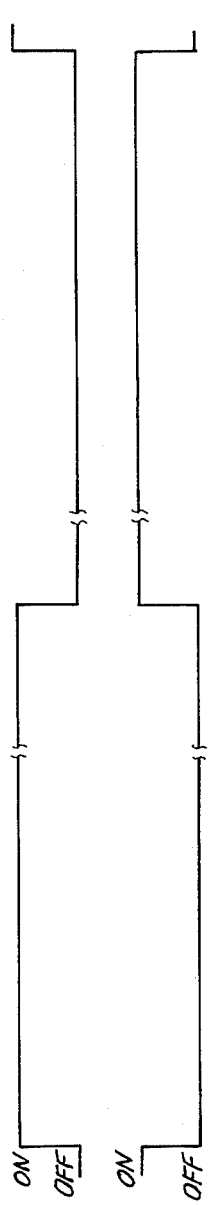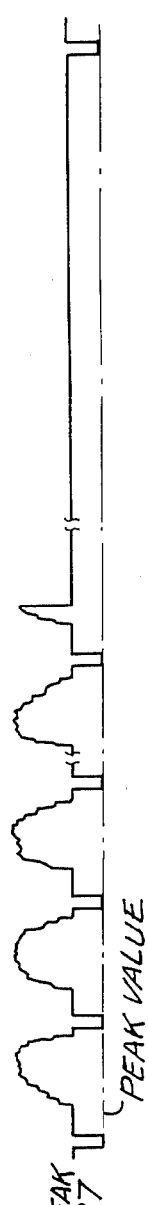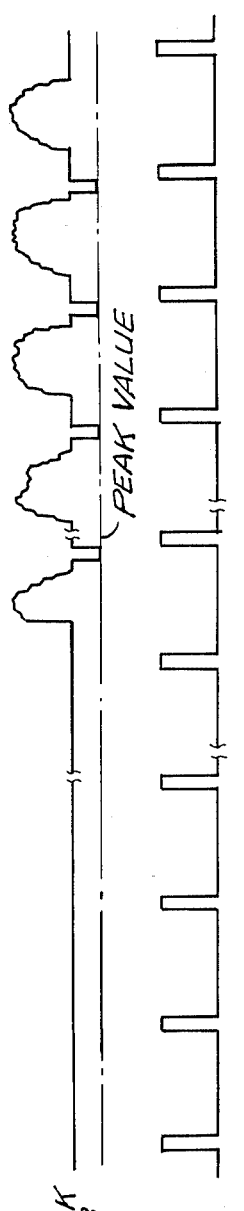

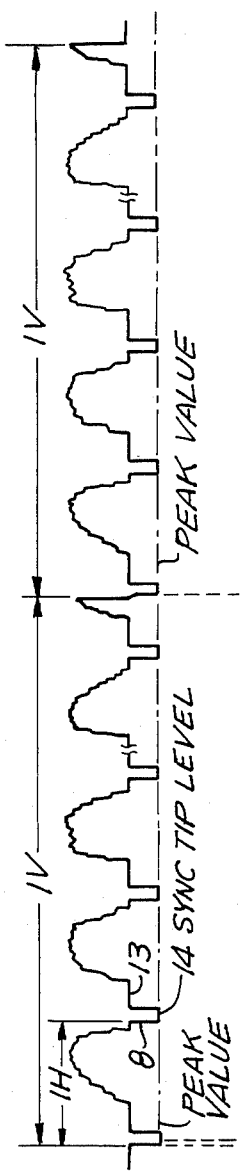
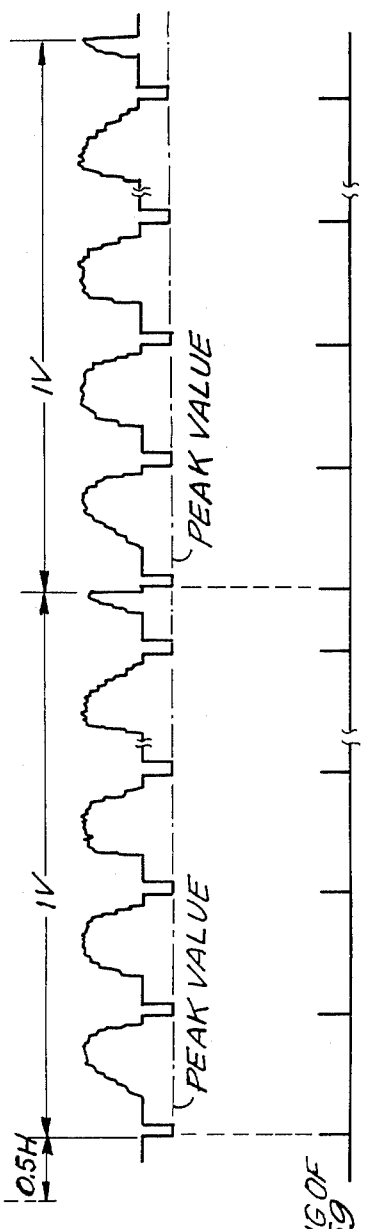
FIG.12(a) INPUT TO PEAK DETECTOR 58
FIG.12(b) DETECTION TIMING OF PEAK DETECTOR 58
FIG.12(c) INPUT TO PEAK DETECTOR 59
FIG.12(d) DETECTION TIMING OF PEAK DETECTOR 59

CIRCUIT FOR PREVENTING FLICKER ATTRIBUTABLE TO FIELD SIGNAL-FRAME SIGNAL CONVERSION

BACKGROUND OF THE INVENTION

1. Field of the Invention

This invention relates to a circuit for preventing appearance of flicker attributable to conversion from a field signal to a frame signal usually provided by the interlaced scanning, and more particularly to a circuit of the kind above described which improves the response of a feedback-clamping loop and can prevent occurrence of undesirable sagging during the vertical synchronizing period. This invention relates also to a flicker preventive circuit which can reliably prevent appearance of flicker without being adversely affected by the temperature dependences and secular variations of various parts of the field signal-frame signal conversion system and without requiring severe adjustments of such parts.

2. Description of the Prior Art

In television, the so-called interlaced scanning is employed in which a picture is scanned with horizontal scanning lines skipped at a rate of one or more lines so as to minimize the influence of flicker perceptible to the eye. Most widely employed in this field is the 2:1 interlaced scanning in which alternate horizontal scanning lines are skipped during scanning of an even field and an odd field. According to the 2:1 interlaced scanning, a rough picture called a field is produced by one vertical scanning, and two fields are superposed to provide a complete picture called a frame. The field repetition rate is 60 fields per second according to, for example, the NTSC standards, and, in this case, the frame repetition rate is 30 frames per second. One frame is completed generally with 525 horizontal scanning lines. The point of beginning of horizontal scanning of an odd field is displaced from that of an even field by ½ of one horizontal scanning period or 0.5 H. FIG. 1 shows a typical example of a composite video signal (a frame signal) representing a frame. In FIG. 1, the reference numeral 1 designates a field signal representing an odd field in the composite video signal (the frame signal), and 2 designates a field signal representing an even field in the composite video signal (the frame signal). Reference numerals 3, 4, 5, 6, 7, 8 and 9 designate a vertical blanking period, front equalizing pulses, a vertical synchronizing signal, serrating pulses, back equalizing pulses, a horizontal synchronizing signal, and a video signal, respectively. A portion A in FIG.1 is shown in an enlarged scale in FIG. 2. In FIG. 2, reference numerals 10, 11, 12, 13 and 14 designate a horizontal blanking period, a front porch, a back porch, a pedestal level, and a sync tip level, respectively.

In recording a video signal on a magnetic tape, a magnetic disk or any other recording medium, it is customary that a signal of one field is allotted to one track or a signal of one frame is allotted to one track. Also, the one-field/one-track recording method is classified into the so-called one-frame/two track recording method in which an odd field and an even field constituting a frame are sequentially recorded on adjacent two tracks respectively and the so-called one-field recording method in which only one of an odd field and an even field only is recorded on one track.

In the case of reproduction of a record recorded according to the one-field recording method, the so-called field/frame conversion mode is most frequently employed in which, utilizing the strong vertical correlation of horizontal scanning lines in a video signal is utilized, the same track is scanned twice to reproduce a frame signal from a field signal of one kind. This field/frame conversion mode is intended principally to improve the recording density so as to enable long-time recording in the case of a movie recording and to increase the number of pictures in the case of a still recording. However, in the case of conversion from a field signal to a frame signal, the effect of interlaced scanning cannot be realized by merely repeatedly reproducing the same field signal twice. This is because mere repetition of reproduction of the same field signal twice cannot provide the relative time lag of 0.5 H although this relative time lag of 0.5 H is actually required between the odd field 1 and the even field 2 in FIG. 1 for the purpose of attaining the effect of interlaced scanning, as will be readily seen from the relation between the vertical synchronizing signal 5 and the horizontal scanning signal 8 as well as the video signal 9 in the individual lines.

With a view to realize the effect of interlaced scanning, it is a common practice to attain conversion from a field signal to a frame signal in a manner as shown in FIG. 3. Referring to FIG. 3, the same field signal repeatedly reproduced is passed or not passed through a 0.5-H delay line 15, and an analog switch 16 is actuated to alternately select the thru field signal 17 and the 0.5-H delayed field signal 18 at a time interval of one vertical scanning period (1 V), thereby attaining the desired conversion from a field signal to a frame signal. However, when the arrangement shown in FIG. 3 is employed directly, there will occur a relative time lag of 0.5 H from 1 V between the vertical synchronizing signals in the field signals. To deal with such a trouble, a method as, for example, shown in FIG. 4 is proposed for selectively changing over the contacts c and d of the analog switch 16. It will be seen in FIG. 4 that, in the period allotted for selection of the thru field signal 17, the portion 19 between the front equalizing pulse period and the back equalizing pulse period is additionally allotted for the selection of the 0.5-H delayed field signal 18. Anyway, for the conversion from a field signal to a frame signal, a circuit as shown in FIG. 3 is employed for alternate selection of the thru field signal and the 0.5-H delayed field signal.

However, due to the fact that the provision of the delay line 15 not only gives rise to a delay of transmission time but also leads to considerably attanuation of the signal and also due to the fact that the offset voltage of the analog switch 16 differs between the two contacts c and d thereof, the converted frame signal includes a signal level difference and a pedestal level difference between the even and odd fields, resulting in appearance of flicker on the reproduced picture. A circuit as shown in FIG. 5 has heretofore been employed so as to prevent appearance of such flicker. Referring to FIG. 5, the prior art flicker preventive circuit includes an amplifier 20, clamping circuits 21, 22, a gain-adjusting potentiometer $VR_1$ and a clamp-level adjusting potentiometer $VR_2$ associated with the combination of the 0.5-H delay line 15 and the analog switch 16. In the flicker preventive circuit shown in FIG. 5, the gain of the amplifier 20 is adjusted by the gain-adjusting potentiometer $VR_1$ so that the converted frame signal has the same signal level in each field, and the clamping level is adjusted by the clamping-level adjusting potentiometer $VR_2$ so that the converted frame signal has the same pedestal level in each field. The above adjustment is usually made by the hand of the operator. Therefore, the proposed circuit is unfit to meet the severe adjustment requirement of $-40$ dB or more demanded for preventing flicker and is not also unfit for mass production. Also, because the 0.5-H delay line 15, analog switch 16, amplifier 20 and clamping circuits 21, 22 tend to undergo secular variations in addition to their inherent temperature dependences, it has been unable to completely eliminate appearance of flicker attributable to the temperature dependences and secular variations of those parts even if the appearance of flicker could be eliminated temporarily by adjustment of the potentiometers $VR_1$ and $VR_2$.

The applicant has developed already a flicker preventive circuit which can automatically prevent appearance of flicker in such a field signal/frame signal conversion system, regardless of the temperature dependences and secular variations of its components. The outline of the automatic flicker preventive circuit, filed already as Japanese Patent Application No. 58-189202 in 1983, will be described with reference to FIGS. 6 and 7 before describing the present invention in detail. FIG. 6 is a circuit diagram of the proposed automatic flicker preventive circuit, and FIG. 7 illustrates the operation of various parts of FIG. 6. Referring to FIG. 6, the automatic flicker preventive circuit includes a 0.5-H delay line 15, a field-selecting analog switch 16, an AGC loop 23 and a feedback-clamping loop 30. The AGC loop 23 acts to maintain constant the sync tip level (14 in FIG. 2) and includes an automatic gain controller 24, the field-selecting analog switch 16, two input-selecting switches 25, 26, two peak detectors 27, 28, and a differential amplifier 29.

Referring to FIG. 6, the analog switch 16 generates a frame signal shown in FIG. 7(a) as its output, and the inputselecting switches 25 and 26 are turned on/off as shown in FIGS. 7(c) and 7(d) respectively under control of a switch control pulse signal 35, which is shown in FIG. 7(b) and selectively passed through an inverter 36. Consequently, the frame signal is applied to the peak detectors 27 and 28 at a time interval of 1 V as shown in FIGS. 7(e) and 7(f) respectively. Thus, the peak value of, for example, the even field signal detected by one of the peak detectors or the peak detector 27 and the peak value of, for example, the odd field signal detected by the other peak detector 28 are applied to the differential amplifier 29, and the output signal 29a of the differential amplifier 29 indicative of the difference is applied to control the automatic gain controller 24 so as to attain coincidence of the peak values of the even and odd fields. When the peak values are the same and constant, the sync level and the signal level are maintained constant. The time constant selected is such that the AGC loop 23 responds to at least the unit field so that the signal level of a succeeding field signal becomes equal to that of a preceding field signal.

On the other hand, the feedback-clamping loop 30 acts to maintain constant the pedestal level (13 in FIG. 2) and includes a sampling switch 31, an integrating circuit 32 and two clamping circuits 33, 34, besides the field selecting switch 16. FIG. 7(g) shows the sampling timing of the sampling switch 31. Referring to FIG. 6, the sampling switch 32 samples the pedestal level in each horizontal scanning period, and the integrating circuit 32 holds the sampled value and compares it with a reference value $Vref_1$. The resultant difference signal 32a is applied from the integrating circuit 32 to the clamping circuits 33 and 34 each of which generates an output signal providing the pedestal level, so as to attain coincidence of the pedestal levels in the individual horizontal scanning periods. The time constant of this feedback-clamping loop 30 is selected to be less than several H at the most so that the clamping level can be stabilized within the period of 1 H to 2 H after change-over between the fields. Thus, flicker can be eliminated as early as possible even in the presence of variations in the characteristics of the two clamping circuits 33 and 34. Two capacitors 37 and 38 shown in FIG. 6 are provided for the purpose of DC cut-off.

As described above, according to the flicker preventive circuit developed already by the applicant, the difference between the peak values (the sync tip levels) of an even field and an odd field is detected, and an automatic gain controller is controlled on the basis of the detected difference signal thereby maintaining constant the signal level in each of the fields. Also, according to the above circuit, the pedestal level is sampled at a time interval of one horizontal scanning period (H) to find the difference between the detected pedestal level and a reference value, and the clamping level is controlled on the basis of the detected difference signal thereby maintaining constant the pedestal level in each of the horizontal scanning periods. Therefore, temperature dependences and secular variations that may be present in the components of the field signal-frame signal conversion system would not exert any substantial influence on the operation of the flicker preventive circuit, and appearance of flicker is minimized. Further, the flicker preventive circuit can be useful for mass-production since the signal level and the pedestal level can be automatically adjusted.

Although the flicker preventive circuit developed by the applicant has been advantageous in various aspects, there have still been two points to be improved. In the first place, its feedback-clamping loop has been found to be improved. More precisely, in the form shown in FIG. 6, the pedestal level cannot be sampled in the vertical scanning period when a sampling pulse signal produced in synchronism with HD pulses derived from a syncrhonizing signal generator (SSG) is used for turning on/off the sampling switch 31. Accordingly, instead of making sampling of the pedestal level in the vertical scanning period, the voltage holding time of the integrating circuit 32 must be extended to about 4H so as to deal with the above situation. However, this leads to a problem of occurrence of a sag in the vertical scanning period and leads also to a problem of delayed response of the feedback-clamping loop. Also, there arises such a problem that a syncrhonizing signal generator (SSG) and a sampling cancelling circuit are additionally required.

Secondly, the responsiveness of the AGC loop has still had a room to be improved, and, also, the flicker preventive effect tending to be affected by the temperature dependences of the components has still had a room to be improved. More precisely, the holding time of at least 1V required for each of the peak detectors 27 and 28 has limited the response speed of the AGC loop, since these peak detectors 27 and 28 receive their input signals at a time interval of 1V only. Unless the AGC loop can respond sufficiently quickly, the AGC loop may not properly function in response to, for example, on/off of the power source or on/off of the input signal.

On the other hand, the peak detectors 27 and 28 are provided independently of each other for detecting the peak values of the thru and delayed field signals respectively. Accordingly, when the temperature dependence of one of the peak detectors differs from that of the other, it leads to appearance of flicker although the flicker may not be so appreciable.

SUMMARY OF THE INVENTION

With a view to solve the prior art problems pointed out above, it is an object of the present invention to provide an improved flicker preventive circuit including a feedback-clamping loop which can respond to its input quickly and which does not cause occurrence of a sag in the vertical synchronizing period.

Another object of the present invention is to provide a quick-responsive flicker preventive circuit by which flicker attributable to the field signal-frame signal conversion can be automatically prevented without regard to temperature dependences and secular variations of the components.

In accordance with one aspect of the present invention which attains the above objects, there is provided, in a field signal-frame signal conversion system including means for applying a delayed field signal delayed by ½ of one horizontal scanning period and a thru field signal, which is the same as the above field signal but not delayed, and switching means for alternately selecting the field signals at a time interval of one vertical scanning period to provide a frame signal, a circuit for preventing appearance of flicker attributable to the field signal-frame signal conversion, said circuit comprising a synchronizing signal separating circuit separating a synchronizing signal from the frame signal appearing at the output of said switching means, a sampling pulse generating circuit generating, in response to the application of the separated synchronizing signal, a sampling pulse signal synchronous with the change points from the sync tip level to the pedestal level and having a pulse width equal to or smaller than that of the serrating pulses, a sample and hold circuit operating in response to the sampling pulse signal for sampling the frame signal appearing at the output of said switching means, a clamping voltage generating circuit comparing the output signal of said sample and hold circuit with a reference value thereby generating a voltage signal proportional to the difference therebetween, and two clamping circuits connected to the thru and delayed field signal lines respectively and controlled by the output signal of said clamping voltage generating circuit for maintaining constant the pedestal level of the thru and delayed field signals.

In accordance with another aspect of the present invention, there is provided, in a field signal-frame signal conversion system including means for applying a delayed field signal delayed by ½ of one horizontal scanning period and a thru field signal, which is the same as the above field signal but not delayed, and switching means for alternately selecting the field signals at a time interval of one vertical scanning period to provide a frame signal, a circuit for preventing appearance of flicker attributable to the field signal—frame signal conversion, said circuit comprising an AGC loop including a first peak detecting circuit disposed in a stage preceding said switching means for detecting the peak value of the thru field signal in each horizontal blanking period, a second peak detecting circuit disposed also in a stage preceding said switching means for detecting the peak value of the delayed field signal in each horizontal blanking period, a differential amplifier generating an output signal indicative of the difference between the peak values detected by said two peak detecting circuits, and an automatic gain controller inserted in the delayed or thru field signal line and controlled by the peak-value difference signal to maintain constant the sync tip level; and a feedback-clamping loop including a sample and hold circuit sampling the pedestal level of the frame signal appearing at the output of said switching means, a clamping voltage generating circuit comparing the output signal of said sample and hold circuit with a reference value therby generating a voltage signal proportional to the difference therebetween, and two clamping circuits connected to the thru and delayed field signal lines respectively and controlled by the output signal of said clamping voltage generating circuit for maintaining constant the pedestal level of the thru and delayed field signals.

In accordance with still another aspect of the present invention, there is provided, in a field signal—frame signal conversion system including means for applying a delayed field signal delayed by ½ of one horizontal scanning period and a thru field signal, which is the same as the above field signal but note delayed, and switching means for alternately selecting the field signals at a time interval of one vertical scanning period to provide a frame signal, a circuit for preventing appearance of flicker attributable to the field signal—frame signal conversion, said circuit comprising an AGC loop including an automatic gain controller amplifying the frame signal appearing at the output of said switching means, a peak detecting circuit detecting the peak value of the amplified frame signal in each horizontal blanking period, and a gain-control voltage generating circuit comparing the output signal of said peak detecting circuit with a reference value thereby generating a voltage signal proportional to the difference therebetween and applying it to said automatic gain controller for maintaining constant the sync tip level of the amplified frame signal; and a feedback-clamping loop including a sample and hold circuit sampling the pedestal level of the frame signal appearing at the output of said switching means, a clamping voltage generating circuit comparing the output signal of said sample and hold circuit with another reference value thereby generating a voltage signal proportional to the difference therebetween, and two clamping circuits connected to the thru and delayed field signal lines respectively and controlled by the output signal of said clamping voltage generating circuit for maintaining constant the pedestal level of the thru and delayed field signals.

BRIEF DESCRIPTION OF THE DRAWINGS

FIGS. 7a–7g illustrate the operation of various parts in the circuit shown in FIG. 6.

FIGS. 12a-12d illustrate the operation of various parts in the circuit shown in FIG. 11.

DESCRIPTION OF THE PREFERRED EMBODIMENTS

Preferred embodiments of the present invention will now be described in detail with reference to the drawings.

Figure 8:
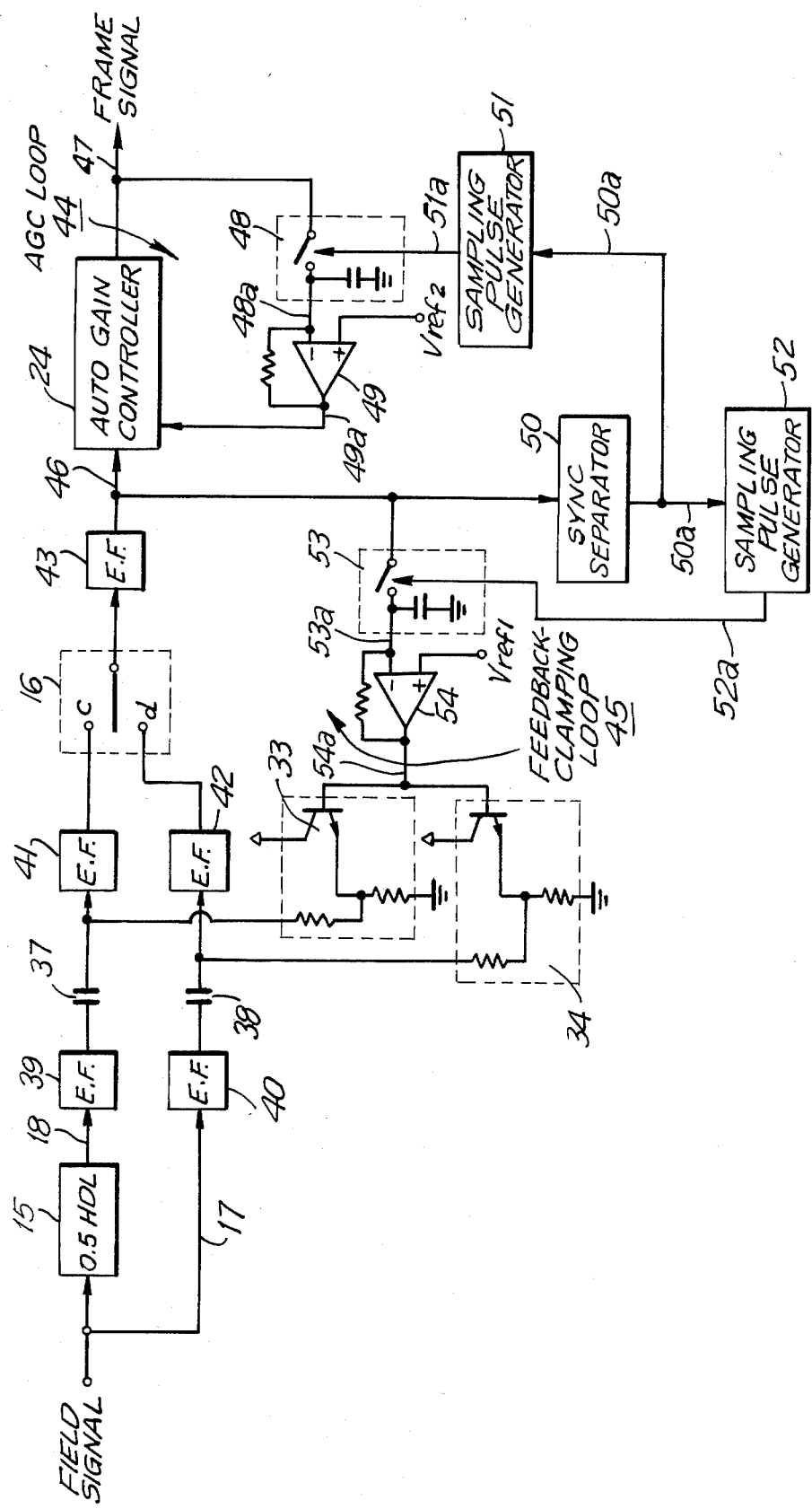
FIG. 8 is a circuit diagram showing the structure of an embodiment of the present invention.
Figure 9:
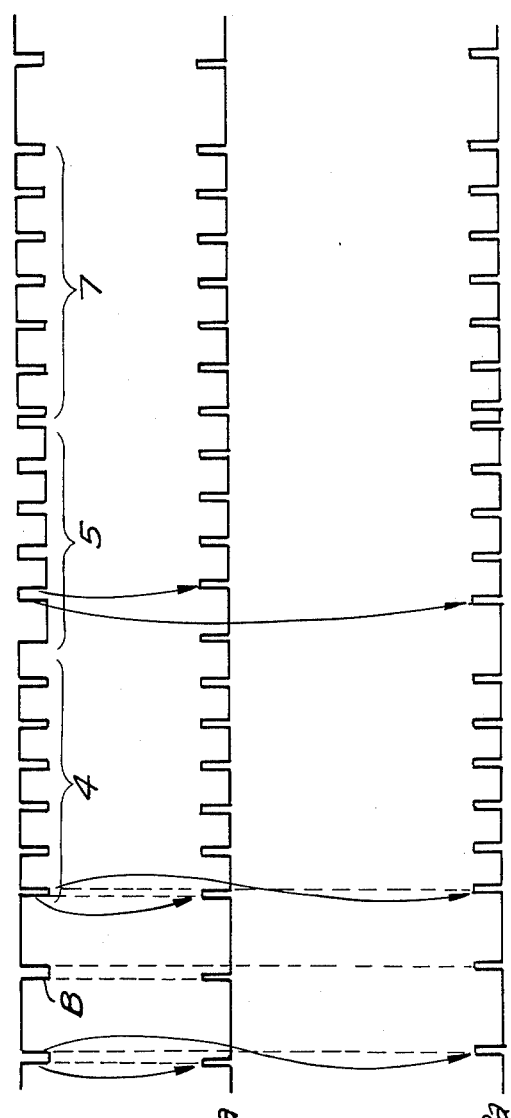
FIGS. 9a-9c illustrate the operation of various parts in the circuit shown in FIG. 8.

FIG. 8 shows the structure of an embodiment of the present invention, and FIG. 9 illustrates operating waveforms appearing at various parts in FIG. 8.

Referring to FIG. 8, the first embodiment of the present invention comprises a 0.5-H delay line 15, a field changeover switch 16, an automatic gain controller 24, clamping circuits 33 and 34, DC cut-off capacitors 37 and 38, impedanceconverting emitter follower circuits 39 to 43, an AGC loop 44, and a feedback-clamping loop 45. Reference numerals 17 and 18 designate a thru field signal and a 0.5-H delayed field signal respectively.

The feedback-clamping loop 45 in the first embodiment of the present invention includes a syncrhonizing signal separating circuit 50 separating a synchronizing signal 50a from a frame signal 46 appearing from the switch 16, a sampling pulse generating circuit 52 producing a sampling pulse signal 52a on the basis of the separated synchronizing signal 50a, a sample and hold circuit 53 sampling the pedestal level of the frame signal 46 in response to the sampling pulse signal 52a, a clamping voltage generating circuit 54 comparing the output signal 53a of the sample and hold circuit 53 with a reference value $Vref_1$ thereby generating a voltage signal 54a proportional to the difference therebetween, and the two clamping circuits 33 and 34 connected to the delayed and thru field signal lines respectively.

Figure 1:
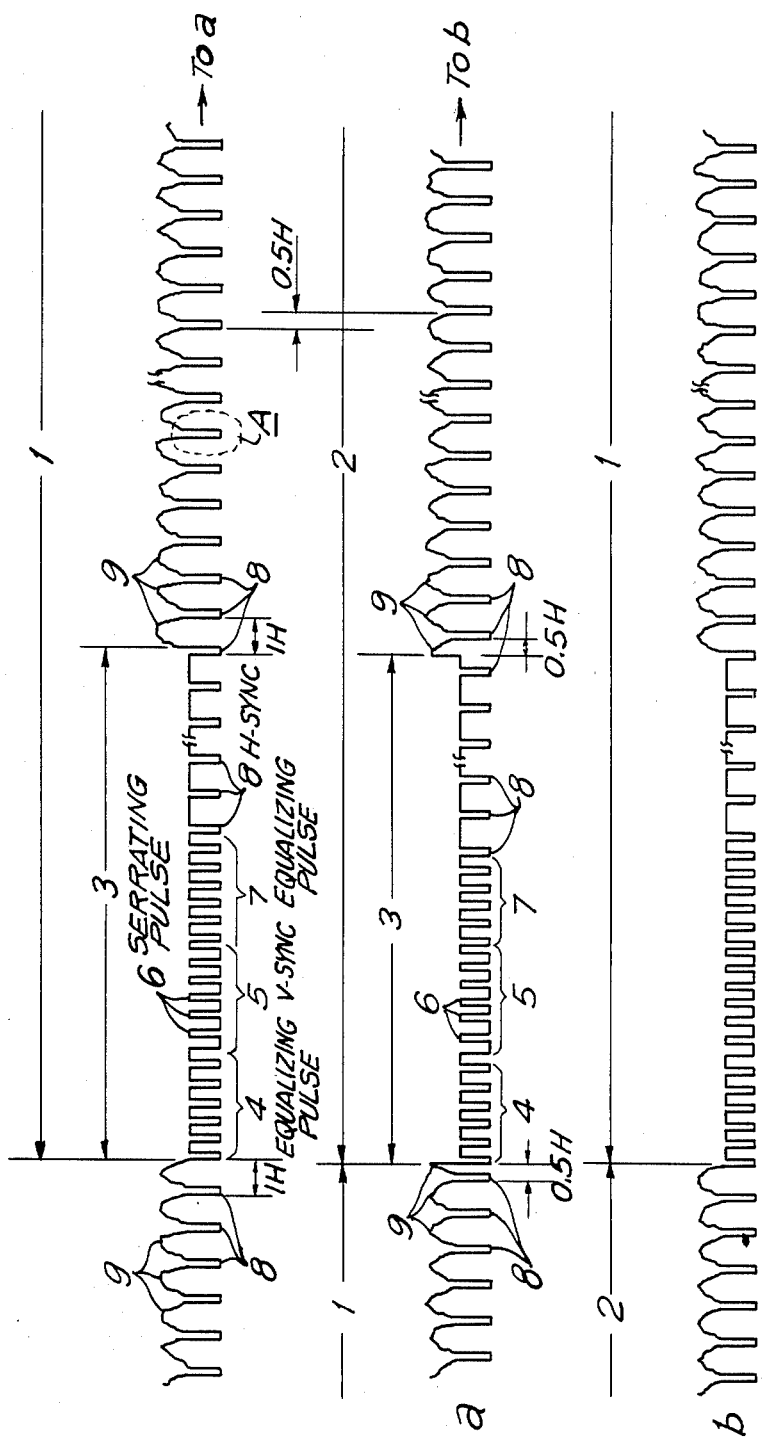
FIG. 1 illustrates a frame signal.
Figure 2:
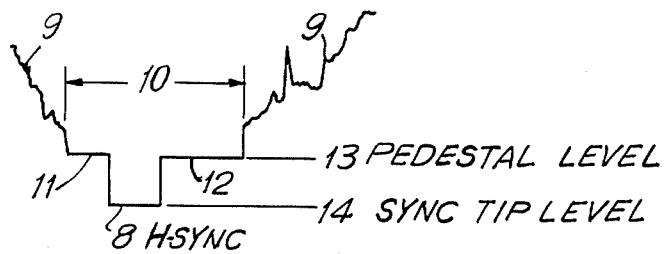
FIG. 2 is an enlarged detail view of a portion A in the waveform shown in FIG. 1.
Figure 3:
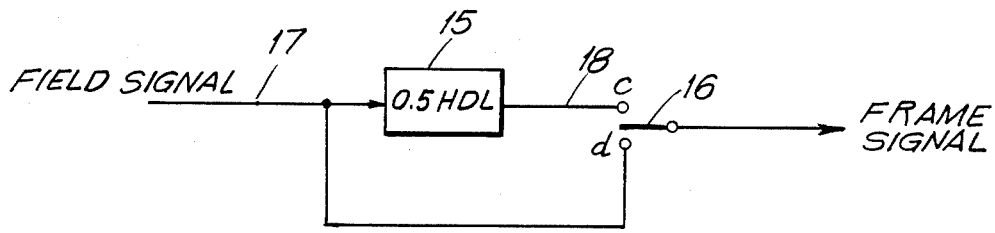
FIG. 3 is a circuit diagram showing the basic principle of conversion from field signal to a frame signal.
Figure 4:
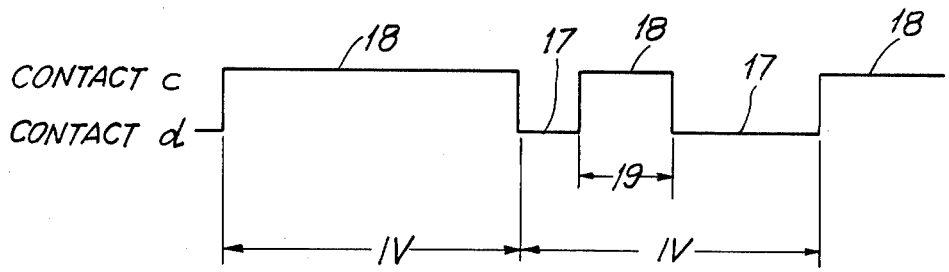
FIG. 4 illustrates the operation of the switch shown in FIG. 3.
Figure 5:
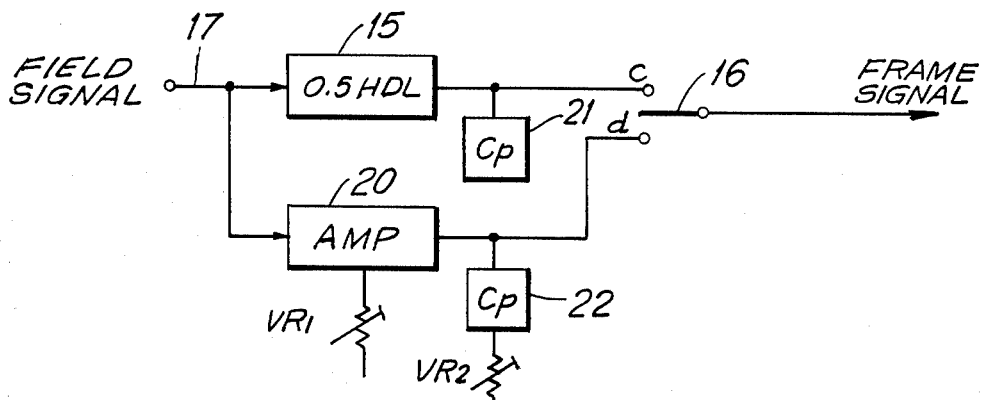
FIG. 5 is a circuit diagram showing the structure of a prior art flicker preventive circuit.

The waveform of the separated synchronizing signal 50a is shown in FIG. 9(a), and that of the sampling pulse signal 52a is shown in FIG. 9(b). It will be seen in FIG. 9(b) that the sampling pulse signal 52a is syncrhonous with the rising edges of the pulses of the synchronizing signal 50a, that is, synchronous with the change points from the sync tip level to the pedestal level of the signal 50a, and the pulse width of the signal 52a is equal to or smaller than that of the serrating pulses 6 appearing in the vertical synchronizing period 5 (FIG. 1). Therefore, the sample and hold circuit 53 can detect the pedestal level during the entire period including the vertical blanking period 3 (FIG. 1) of the frame signal 46.

The clamping voltage generating circuit 54 compares the sampled pedestal level with the reference value $Vref_1$ and applies its output signal 54a indicative of the difference therebetween to the clamping circuits 33 and 34 so that the thru and delayed field signals 17 and 18 have the same and constant pedestal level. Therefore, the feedback-clamping loop 45 in the first embodiment can clamp the pedestal level during the entire period including the vertical blanking period. Also, since the sampling interval is not longer than 1 H, the required voltage holding time of the sample and hold circuit 53 is as short as only about 1 H, so that the feedback-clamping loop 45 can respond quickly.

In the embodiment shown in FIG. 8, the sampling pulse signal 52a for sampling the pedestal level is produced on the basis of the synchronizing signal 50a separated from the frame signal 46. By producing the sampling pulse signal synchronous with the rising edges of the synchronizing signal, that is, the change points from the sync tip level to the pedestal level, the pedestal level can be sampled even in the vertical synchronizing period. Therefore, the feedback-clamping on the basis of the sampled pedestal level eliminates an undesirable sag appearing in the vertical synchronizing period. Further, due to the fact that the voltage holding time of the sample and hold circuit 53 is short or only about 1 H, the clamping operation is done with a good response performance regardless of on/off of the power source or on/off of the field selecting switch 16. Furthermore, any especial unit such as a synchronizing signal generator (SSG) for producing horizontal synchronizing pulses (HD pulses) is unnecessary.

The structure and function of the AGC loop 44 employed in the embodiment shown in FIG. 8 will then be described. This AGC loop 44 includes the automatic gain controller 24 amplifying the frame signal 46 applied from the switch 16, a sample and hold circuit 48 sampling the peak, that is, the sync tip level of the amplified frame signal 47, a gain-control voltage generating circuit 49 comparing the output signal 48a of the sample and hold circuit 48 with a reference value $Vref_2$ thereby generating a voltage signal 49a proportional to the difference therebetween, the aforementioned synchronizing signal separating circuit 50 separating the synchronizing signal 50a from the frame signal 46, and a sampling pulse generating circuit 51 producing a sampling pulse signal 51a on the basis of the separated synchronizing signal 50a. This sampling pulse signal 51a has a waveform as shown in FIG. 9(c). It will be seen in FIG. 9(c) that the sampling pulse signal 51a is synchronous with the falling edges, that is, the change points from the pedestal level to the sync tip level of the synchronizing signal 50a, and its pulse width is equal to or smaller than that of the serrations of the sync level or equalizing pulses in the equalizing periods 4 and 7 (FIG. 1). Therefore, the sample and hold circuit 48 can detect the sync tip level during the entire period including the vertical blanking period 3(FIG. 1) of the amplified frame signal 47. Thus, the sample and hold circuit 48 operates as a peak detector. The gain-control voltage generating circuit 49 compares the output signal 48a of the sample and hold circuit 48 with the reference value $Vref_2$ and applies a voltage signal 49a indicative of the difference therebetween to the automatic gain controller 24, so that the sync tip level of the amplified frame signal 47 can be maintained constant. Therefore, the required voltage holding time of the sample and hold circuit 48 is short or only about 1 H, so that the AGC loop 44 can respond very quickly. Thus, the AGC loop 44 makes its AGC operation immediately in response to on/off of the power source or on/off of the switch 16. The AGC loop 23 in the prior art flicker preventive circuit shown in FIG. 6 includes two peak detectors 27 and 28, and a difference between the temperature dependences of these two peak detectors 27 and 28 has resulted in appearance of flicker. In contrast, the AGC loop 44 in the improved flicker preventive circuit shown in FIG. 8 includes only one peak detector. Therefore, no flicker attributable to the temperature dependence of the single peak detector appears.

Figure 10:
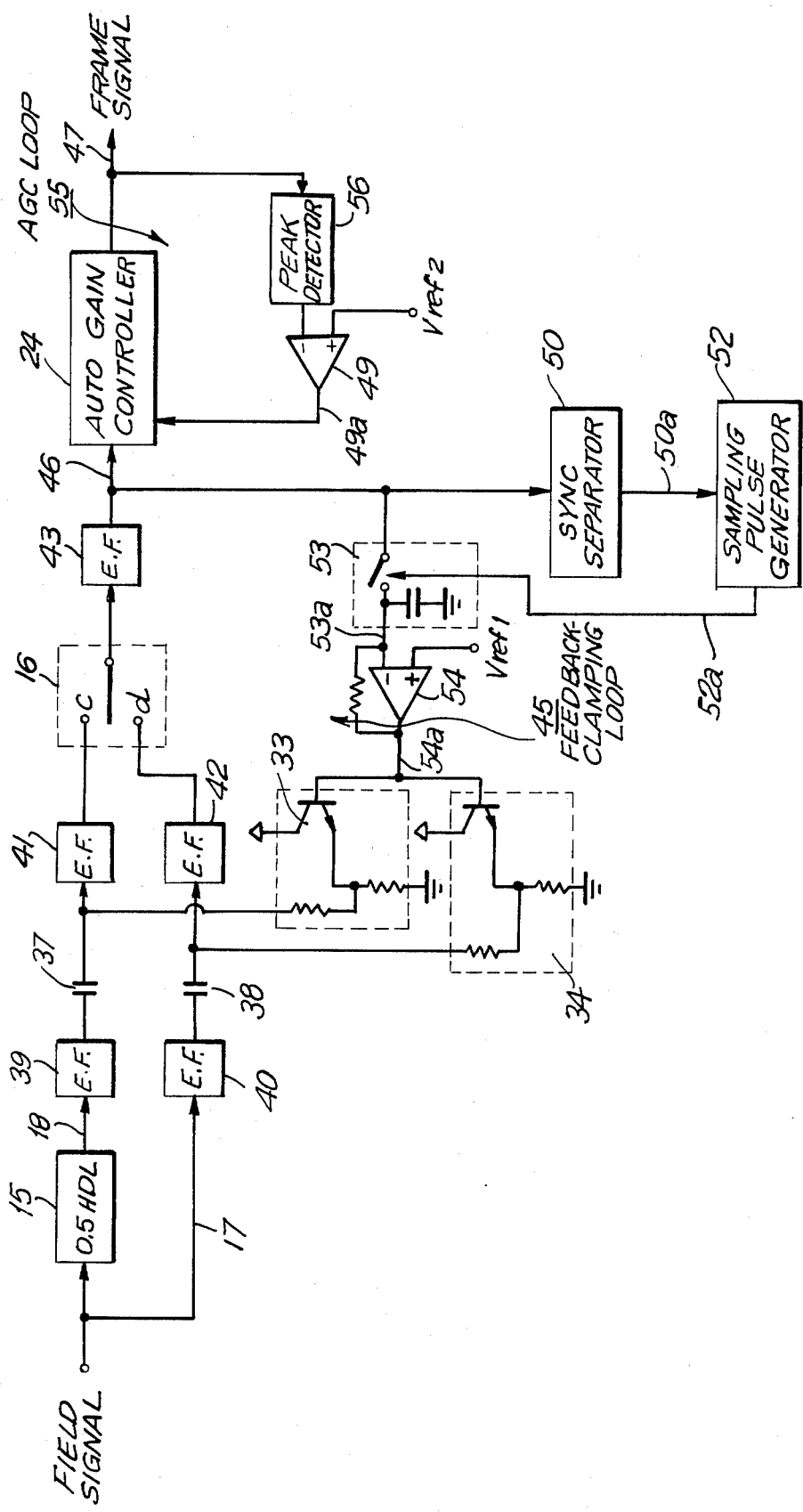
FIG. 10 is a circuit diagram showing the structure of another embodiment of the present invention.

Another embodiment of the present invention shown in FIG. 10 is a partial modification of the embodiment shown in FIG. 8 in that its AGC loop 55 only is slightly different from the AGC loop 44 shown in FIG. 8. Referring to FIG. 10, the AGC loop 55 includes a peak detector 56 combined with the automatic gain controller 24 and the gain-control voltage generating circuit 49. The sampling pulse generating circuit 51 shown in FIG. 8 is eliminated. The peak detector 56 detects the peak value, that is, the sync tip level of the amplified frame signal 47. Therefore, when the voltage holding time is selected to be about 1 H, the AGC loop 55 can respond very quickly as in the case of the embodiment shown in FIG. 8. Further, since only one peak detector 56 is provided for the peak detection, no flicker attributable to the temperature dependence of the single peak detector 56 appears.

In each of the AGC loops 44 and 55 shown in FIGS. 8 and 10 respectively, the frame signal 46 obtained by conversion of the thru and delayed field signals by the switch 16 is amplified by the automatic gain controller 24, and the peak value (the sync tip level) of the amplified frame signal 47 is detected by the peak detecting circuit 48 or 56 to be compared with the reference value Vref$_2$. The automatic gain controller 24 is so controlled that the peak value of the amplified frame signal 47 can be maintained constant. Therefore, only one peak detecting circuit suffices, and there is always an input applied thereto. Since the input signal is always applied to the peak detecting circuit, the voltage holding time which is as short as about 1 H suffices, and the AGC loop can respond very quickly. Also, since only one peak detecting circuit is provided, no flicker attributable to the temperature dependence of the single peak detecting circuit appears.

Figure 6:
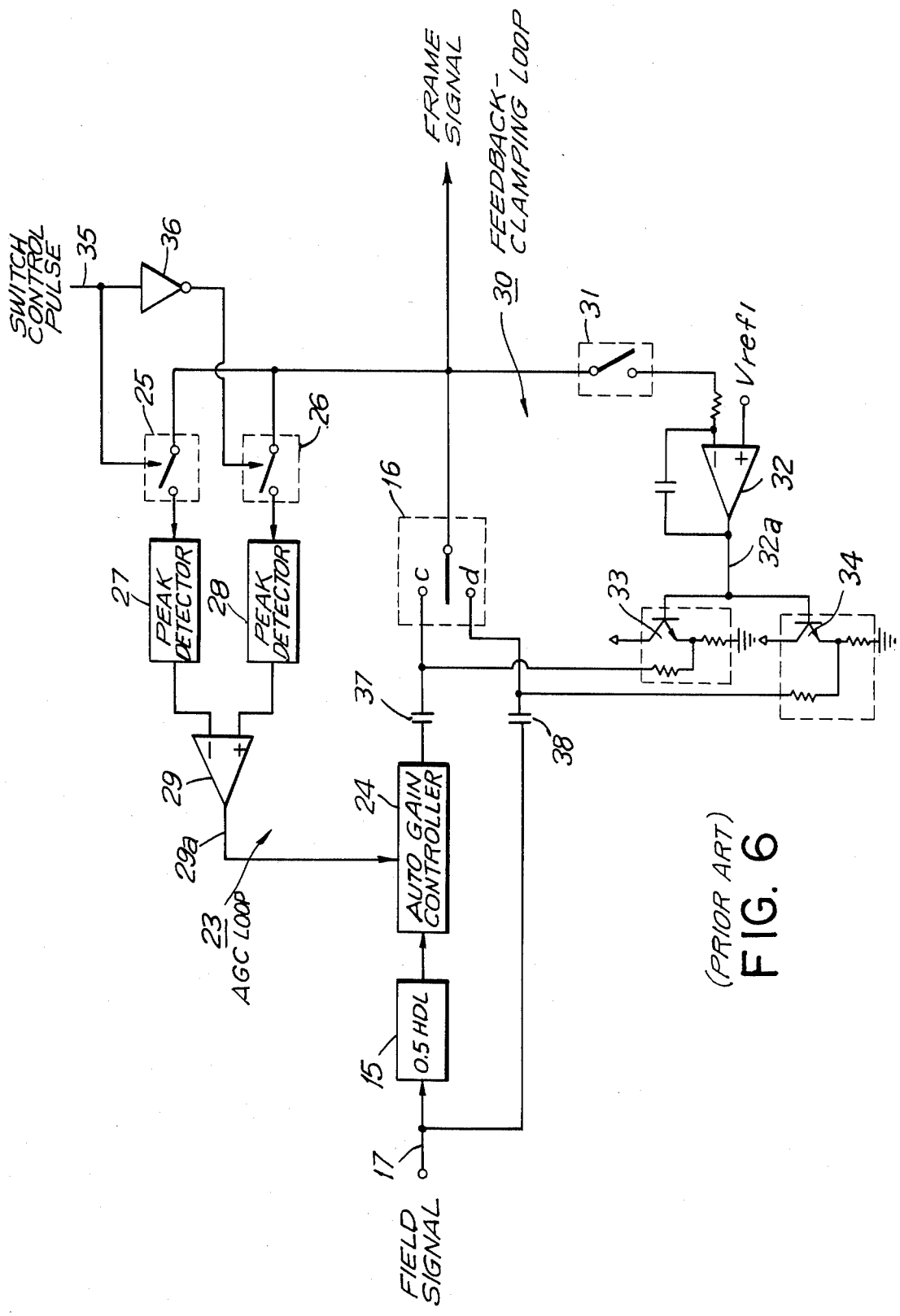
FIG. 6 is a circuit diagram showing the structure of an automatic flicker preventive circuit proposed already by the applicant.

The feedback-clamping loop 45 shown in each of FIGS. 8 and 10 may be replaced by that 30 shown in FIG. 6. In such a case, however, it is a general procedure that a sampling pulse signal is produced on the basis of HD pulses from a synchronizing signal generator (SSG) and is applied to the sampling switch 31. Therefore, it is normally unable to sample the pedestal level during the vertical synchronizing period 5 (FIG. 1), and it becomes necessary to extend the voltage holding time of the integrating circuit 32 to a considerably long period of about 4 H. From this aspect, the feedback-clamping loop 45 shown in each of FIGS. 8 and 10 is advantageous over the loop 30 shown in FIG. 6 in that the capability of clamping of the pedestal level even in the vertical synchronizing period eliminates occurrence of an undesirable sag, and the quick response ensures immediate starting of the clamping operation in response to on/off of the power source of on-off of the switch 16.

Still another embodiment of the flicker preventive circuit according to the present invention will be described with reference to FIG. 11.

Figure 11:
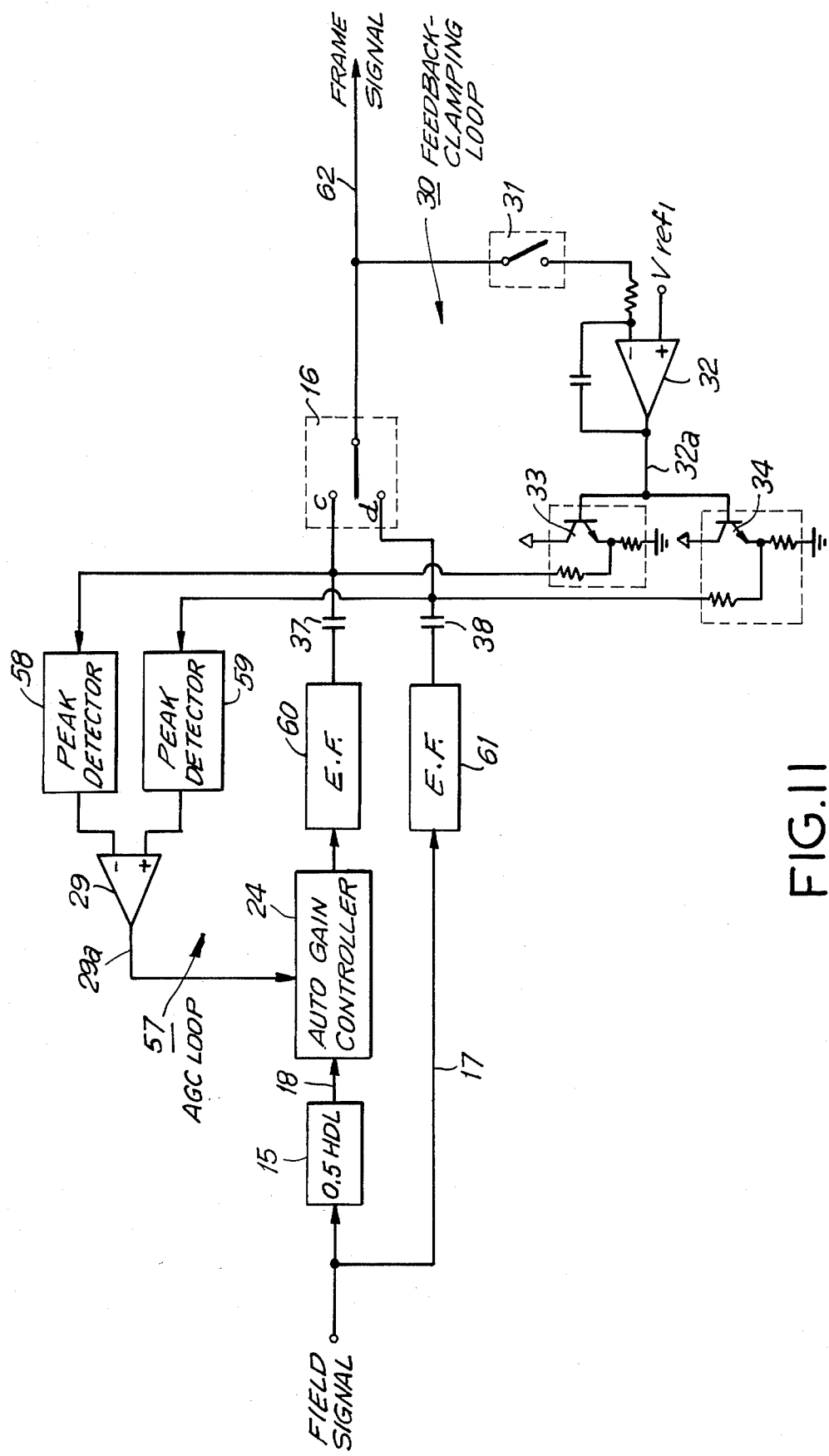
FIG. 11 is a circuit diagram showing the structure of still another embodiment of the present invention.

The flicker preventive circuit shown in FIG. 11 is an improvement in the prior art circuit shown in FIG. 6. The structure shown in FIG. 11 is the same as that shown in FIG. 6 except that two peak detectors 58 and 59 each having a voltage holding time of about 1 H are disposed in a stage preceding the field selecting switch 16, and the clamped signal by the clamping circuits 33 and 34 is directly applied to the peak detectors 58 and 59 respectively to constitute an AGC loop 57. Therefore, the same reference numerals are used in FIG. 11 to designate the same parts appearing in FIG. 6 to dispense with repetition of the explanation of such parts. In FIG. 11, emitter follower circuits 60 and 61 are provided for the purpose of impedance conversion.

The operation of the flicker preventive circuit shown in FIG. 11 will now be described. The field signal 18 passed through the 0.5-H delay line 15 is applied to one of the peak detectors or peak detector 58, and, at the same time, the thru field signal 17 is applied to the other peak detector 59. The two peak detectors 58 and 59 detect the peak values, that is, the sync tip levels of the respective field signals at a time interval of 1 H, and their output signals indicative of the detected sync tip levels respectively are supplied to the differential amplifier 29. The differential amplifier 29 applies its output signal 29a, proportional to the difference between the two inputs, to the automatic gain controller 24 to control the gain so that coincidence can be achieved between the sync tip levels of the thru field signal 17 and the delayed field signal 18. The voltage holding time required for each of the peak detectors 58 and 59 is as short as about 1 H, since they have always the inputs thereto unlike those shown in FIG. 6. Therefore, the AGC loop 57 can respond very quickly. The feedback-clamping loop 30 in FIG. 11 is entirely the same as that 30 shown in FIG. 6. In the loop 30, the pedestal level of the frame signal 62 sampled by the sampling switch 31 is held in the integrating circuit 32 and also compared with the reference value Vref$_1$. The clamping potential signal 32a proportional to the difference therebetween is applied from the integrating circuit 32 to the clamping circuits 33 and 34 to control the latter thereby maintaining constant the pedestal level.

The peak detectors 58 and 59 in FIG. 11 may be either peak detacting circuits or sample and hold circuits. However, it is necessary to set the detection timing so that the sync tip level of each field signal can be detected in a manner as shown in FIG. 12.

Figure 13:
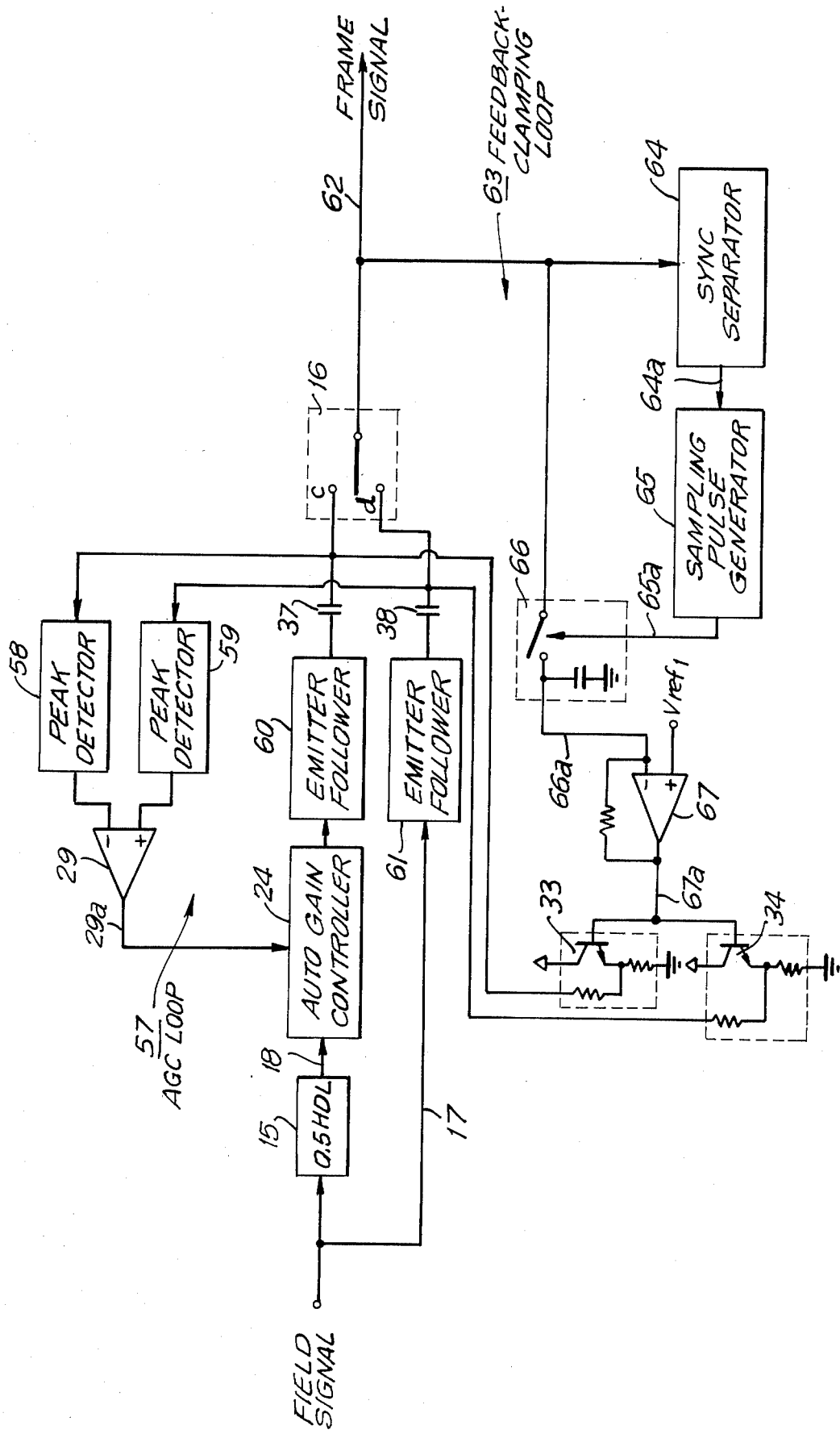
FIG. 13 is a circuit diagram showing the structure of yet another embodiment of the present invention.

FIG. 13 shows yet another embodiment of the present invention which includes a modified feedback-clamping loop designated generally by the reference numeral 63. In FIG. 13, the AGC loop 57 is the same as that shown in FIG. 11. The feedback-clamping loop 63 in the embodiment shown in FIG. 13 is featured in that it is improved in its response speed compared with the loops 30 shown in FIGS. 6 and 11 and that it reduces the possibility of a sag which may occur during the vertical synchronizing period 5(FIG. 1). In other words, in the case of the loops 30 shown in FIGS. 6 and 11, it is a general procedure that the sampling switch 31 is actuated by a sampling pulse signal produced on the basis of HD pulses from a synchronizing signal generator (SSG). Therefore, it is normally unable to sample the pedestal level during the vertical synchronizing period 5, and it becomes necessary to extend the voltage holding time of the integrating circuit 32 to a considerably long period of about 4 H.

The feedback-clamping loop 63 in the embodiment shown in FIG. 13 includes a synchronizing signal separating circuit 64 separating the synchronizing signal 64a from the frame signal 62 applied from the switch 16, a sampling pulse generating circuit 65 producing a sampling pulse signal 65a on the basis of the separated synchronizing signal 64a, a sample and hold circuit 66 sampling the pedestal level of the frame signal 62 in response to the sampling pulse signal 65a, a clamping voltage generating circuit 67 comparing the output signal 66a of the sample and hold circuit 66 with a reference value $V_{ref1}$ thereby generating a voltage signal 67a proportional to the difference therebetween, and the aforementioned two clamping circuits 33 and 34 connected to the delayed and thru field signal lines respectively.

Figure 14:
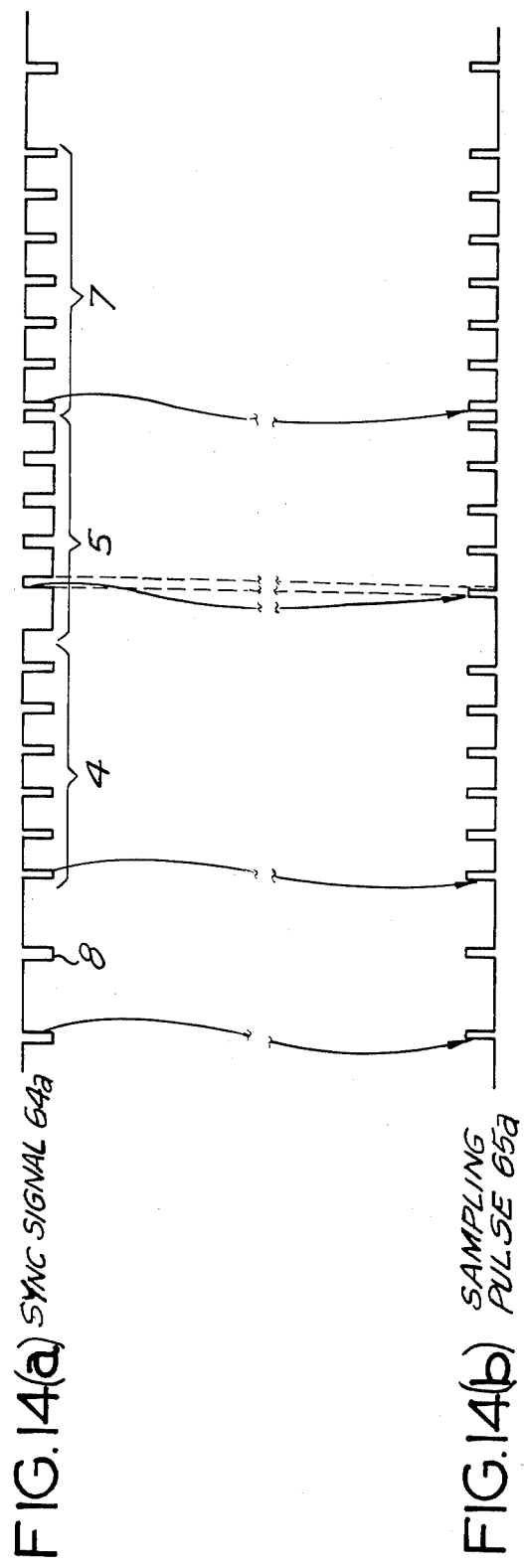
FIGS. 14a and 14b illustrate the operation of the circuit shown in FIG. 13.

The waveform of the separated synchronizing signal 64a is shown in FIG. 14(a), and that of the sampling pulse signal 65a is shown in FIG. 14(b). It will be seen in FIG. 14(b) that the sampling pulse signal 65a is synchronous with the rising edges of the pulses, that is, the change points from the sync tip level to the pedestal level of the synchronizing signal 64a, and the pulse width of the signal 65a is equal to or smaller than that of the serrating pulses 6 appearing in the vertical synchronizing period 5 (FIG. 1). Therefore, the sample and hold circuit 66 can detect the pedestal level during the entire period including the vertical blanking period 3 (FIG. 1) of the frame signal 62.

The clamping voltage generating circuit 67 compares the sampled pedestal level with the reference valve $V_{ref1}$ and applies its output signal 67a indicative of the difference therebetween to the clamping circuits 33 and 34 so that the thru and delayed field signals 17 and 18 have the same and constant pedestal level. Therefore, the feedback-clamping loop 63 in this embodiment can clamp the pedestal level during the entire period including the vertical blanking period. Also, since the sampling interval is not longer than 1 H, the required voltage holding time of the sample and hold circuit 66 is as short as only about 1 H, so that the feedback-clamping loop 63 can operate with a high response speed.

Although the automatic gain controller 24 is inserted in the same signal line as the 0.5 -H delay line 15 in each of the embodiments shown in FIGS. 11 and 13, it may be inserted in the thru field signal line. In such a case, it is preferable that the peak detectors 58 and 59 are connected to the plus and minus input terminals respectively of the differential amplifier 29 as shown in FIG. 15, unlike the connections shown in FIGS. 11 and 13.

Figure 15:
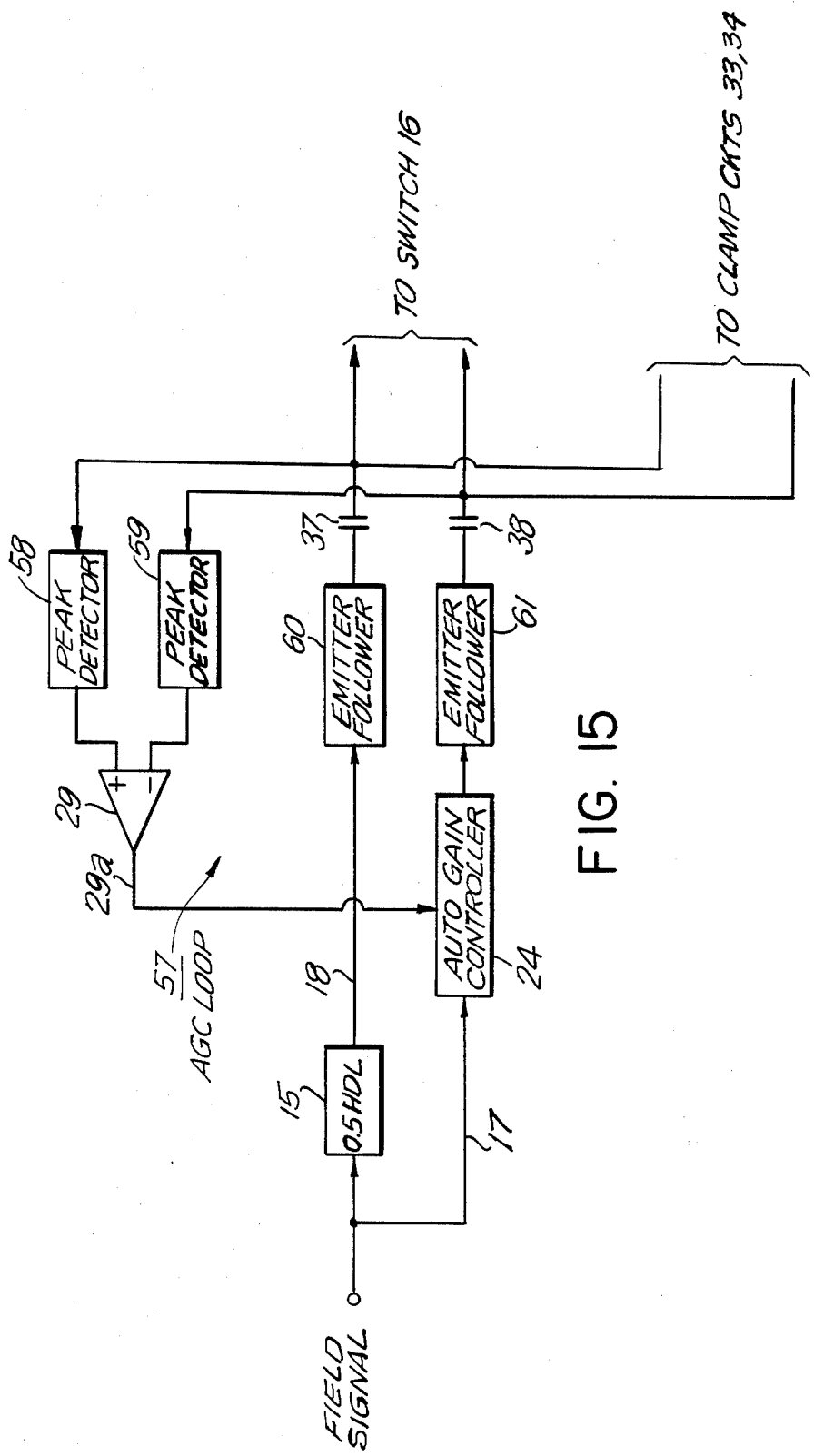
FIG. 15 is a circuit diagram showing the structure of part of a further embodiment of the present invention.

In each of the embodiments shown in FIGS. 11, 13 and 15, the peak values of the thru field signal and delayed field signal respectively are detected before being converted into the frame signal. Therefore, the two peak detecting circuits 58 and 59 have always their input signals applied thereto, and the voltage holding time is as short as about 1 H, so that the AGC loop can make the AGC operation with a very high response speed. It is apparent that the frame signal after conversion can be automatically controlled to have the same signal level between the fields, because the automatic gain controller 24 is controlled by the difference signal indicative of the difference between the peak values of the thru and delayed field signals. It is also apparent that the pedestal level of the frame signal can be automatically maintained constant, because the pedestal level of the field-frame converted signal is sampled at the time interval of one horizontal scanning period (1 H) so as to control the clamping level of the thru and delayed field signals before being converted into the frame signal. Therefore, even in the presence of temperature dependences and/or secular variations in the components of the field signal/frame signal conversion system, appearance of flicker can be minimized without being adversely affected by the temperature dependences and- /or secular variations. Also, by virtue of the fact that the signal level and pedestal level can be automatically adjusted, the manual adjustment required hitherto during the manufacturing process is unnecessary, and the flicker preventive circuit can be useful for mass-production.

I claim:

1. In a field signal-frame signal conversion system including means for applying a delayed field signal delayed by ½ of one horizontal scanning period and a thru field signal, which is the same as the above field signal but not delayed, and switching means for alternately selecting the field signals at a time interval of one vertical scanning period to provide a frame signal, a circuit for preventing appearance of flicker attributable to the field signal—frame signal conversion, said circuit comprising a synchronizing signal separating circuit separating a synchronizing signal from the frame signal appearing at the output of said switching means, a sampling pulse generating circuit generating, in response to the application of the separated synchronizing signal, a sampling pulse signal synchronous with the change points from the sync tip level to the pedestal level and having a pulse width equal to or smaller than that of the serrating pulses, a sample and hold circuit operating in response to the sampling pulse signal for sampling the frame signal appearing at the output of said switching means, a clamping voltage generating circuit comparing the output signal of said sample and hold circuit with a reference value thereby generating a voltage signal proportional to the difference therebetween, and two clamping circuits connected to the thru and delayed field signal lines respectively and controlled by the output signal of said clamping voltage generating circuit for maintaining constant the pedestal level of the thru and delayed field signals.

2. In a field signal-frame signal conversion system including means for applying a delayed field signal delayed by ½ of one horizontal scanning period and a thru field signal, which is the same as the above field signal but not delayed, and switching means for alternately selecting the field signals at a time interval of one vertical scanning period to provide a frame signal, a circuit for preventing appearance of flicker attributable to the field signal-frame signal conversion, said circuit comprising an AGC loop including a first peak detecting circuit disposed in a stage preceding said switching means for detecting the peak value of the thru field signal in each horizontal blanking period, a second peak detecting circuit disposed also in a stage preceding said switching means for detecting the peak value of the delayed field signal in each horizontal blanking period, a differential amplifier generating an output signal indicative of the difference between the peak values detected by said peak detecting circuits, and an automatic gain controller inserted in the delayed or thru field signal line and controlled by the peak-value difference signal to maintain constant the sync tip level; and a feedback-clamping loop including a sample and hold circuit sampling the pedestal level of the frame signal appearing at the output of said switching means, a clamping voltage generating circuit comparing the output signal of said sample and hold circuit with a reference value thereby generating a voltage signal proportional to the difference therebetween, and two clamping circuits connected to the thru and delayed field signal lines respectively and controlled by the output signal of said clamping voltage generating circuit for maintaining constant the pedestal level of the thru and delayed field signals.

3. A flicker preventive circuit as claimed in claim 2, wherein each of said peak detecting circuits is a peak detector having a voltage holding time of about one horizontal scanning period.

4. A flicker preventive circuit as claimed in claim 2, wherein each of said peak detecting circuits is a sample and hold circuit having a voltage holding time of about one horizontal scanning period.

5. A flicker preventive circuit as claimed in claim 2, 3 or 4, wherein said feedback-clamping loop includes a synchronizing signal separating circuit separating a synchronizing signal from the frame signal appearing at the output of said switching means, and a sampling pulse generating circuit generating, in response to the application of the separated synchronizing signal, a sampling pulse signal synchronous with the change points from the sync tip level to the pedestal level and having a pulse width equal to or smaller than that of the serrating pulses, said sampling pulse signal being applied to said sample and hold circuit.

6. In a field signal-frame signal conversion system including means for applying a delayed field signal delayed by ½ of one horizontal scanning period and a thru field signal, which is the same as the above field signal but not delayed, and switching means for alternately selecting the field signals at a time interval of one vertical scanning period to provide a frame signal, a circuit for preventing appearance of flicker attributable to the field signal-frame signal conversion, said circuit comprising an AGC loop including an automatic gain controller amplifying the frame signal appearing at the output of said switching means, a peak detecting circuit detecting the peak value of the amplified frame signal in each horizontal blanking period, and a gain-control voltage generating circuit comparing the output signal of said peak detecting circuit with a reference value thereby generating a voltage signal proportional to the difference therebetween and applying it to said automatic gain controller for maintaining constant the sync tip level of the amplified frame signal; and a feedback-clamping loop including a sample and hold circuit sampling the pedestal level of the frame signal appearing at the output of said switching means, a clamping voltage generating circuit comparing the output signal of said sample and hold circuit with another reference value thereby generating a voltage signal proportional to the difference therebetween, and two clamping circuits connected to the thru and delayed field signal lines respectively and controlled by the output signal of said clamping voltage generating circuit for maintaining constant the pedestal level of the thru and delayed field signals.

7. A flicker preventive circuit as claimed in claim 6, wherein said peak detecting circuit is a peak detector having a voltage holding time of about one horizontal scanning period.

8. A flicker preventive circuit as claimed in claim 6, wherein said peak detecting circuit is a sample and hold circuit having a voltage holding time of about one horizontal scanning period, and wherein there are further provided a synchronizing signal separating circuit separating a synchronizing signal from the frame signal appearing at the output of said switching means, and a sampling pulse generating circuit generating, in response to the application of the separated synchronizing signal, a sampling pulse signal synchronous with the change points from the pedestal level to the sync tip level and having a pulse width equal to or smaller than that of the equalizing pulses, said sampling pulse signal being applied to said sample and hold circuit.

9. A flicker preventive circuit as claimed in claim 6, 7 or 8, wherein said feedback-clamping loop includes a synchronizing signal separating circuit separating a synchronizing signal from the frame signal appearing at the output of said switching means, and a sampling pulse generating circuit generating, in response to the application of the separated synchronizing signal, a sampling pulse signal synchronous with the change points from the sync tip level to the pedestal level and having a pulse width equal to or smaller than that of the serrating pulses, said sampling pulse signal being applied to said sample and hold circuit of the feedback-clamping loop.

* * * * *